United States Patent Office 3,172,035
Patented Mar. 2, 1965

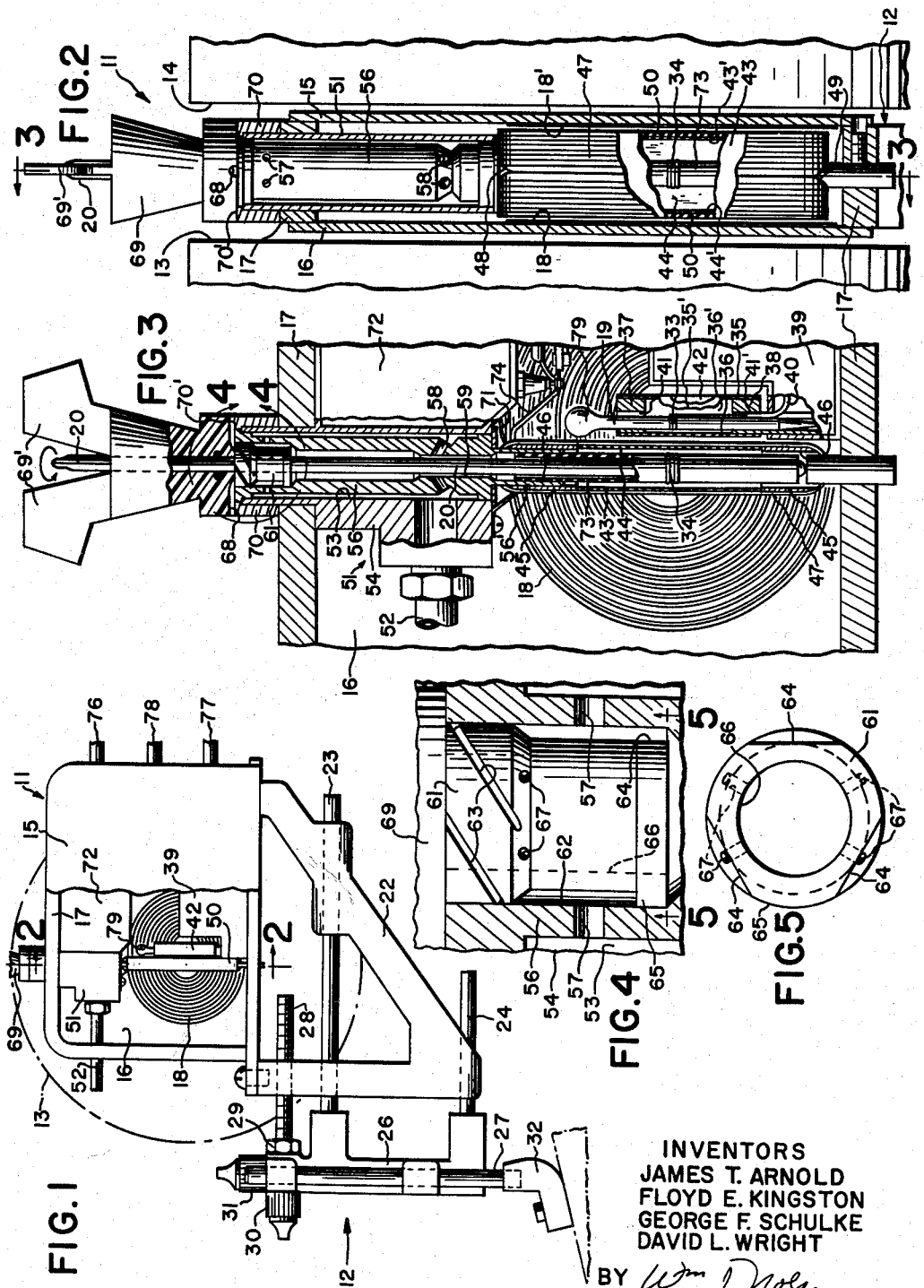
March 2, 1965     J. T. ARNOLD ETAL     3,172,035
PROBE FOR A GYROMAGNETIC RESONANCE APPARATUS
Filed May 8, 1961
INVENTORS
JAMES T. ARNOLD
FLOYD E. KINGSTON
GEORGE F. SCHULKE
DAVID L. WRIGHT
BY
ATTORNEY

3,172,035
PROBE FOR A GYROMAGNETIC RESONANCE APPARATUS
James T. Arnold, Los Altos, Floyd E. Kingston, Palo Alto, George F. Schulke, Los Altos, and David L. Wright, Palo Alto, Calif., assignors to Varian Associates, Palo Alto, Calif., a corporation of California
Filed May 8, 1961, Ser. No. 108,407
19 Claims. (Cl. 324—.5)

This invention relates in general to gyromagnetic resonance apparatus and more particularly to an improved structure for supporting two samples within the magnetic field of a gyromagnetic resonance apparatus utilizing side band resonance techniques.

A United States patent application, Serial No. 71,184, entitled "Gyromagnetic Resonance Method and Apparatus," filed on November 23, 1960, by Weston A. Anderson, Forrest A. Nelson and David L. Wright, and assigned to the assignee of this application, abandoned in favor of continuation Serial No. 174,950, filed Feb. 23, 1962, discloses a high resolution gyromagnetic resonance spectrometer system which is field-frequency stabilized and insensitive to probe unbalance. This spectrometer system utilizes two separate channels, a measurement or chemical analysis channel containing the unknown sample under analysis, and a control channel containing a known sample for automatically adjusting the parameters of the measurement channel to render the measurement channel field-frequency stabilized. This control channel comprises a nuclear side band resonance oscillator, the side band resonance being produced by a modulation of the strong polarizing magnetic field at an audio or low freqency which is produced by the side band resonance oscillator itself. The audio frequency output of the oscillator is also utilized to modulate the polarizing magnetic field at the sample under analysis so that the measurement channel is also operating on a side band resonance principle.

One distinct advantage of a system of the above-described type is that the magnet which is needed to supply polarizing magnetic field $H_0$ to the sample under analysis (for example, 14,100 gauss in a proton spectrometer with a driving radio frequency (R.F.) of 60 megacycles) need not be as stable as in previous high resolution spectrometer systems since the system will automatically compensate for magnetic field fluctuations and the like. For example, whereas an electromagnet having a pole face diameter of 12" and weighing, in combination with its power supply, a total of about 520 pounds was necessary in previous high resolution work to provide the desired high strength magnetic field (for example, 14,000 gauss), similar results have been obtained with a side band resonance system of the above type utilizing an electromagnet having a pole face diameter of 6" and a total weight, including power supply, of only 1300 pounds to supply about the same strength magnetic field. This reduction in magnet specifications, including a smaller and narrower gap between pole faces than previously available, places very stringent requirements on other aspects of the system, in particular the probe structure utilized to position the two samples and associated elements within the small and narrow space between the probe faces of the polarizing magnet; the probe must now carry a much heavier responsibility in attaining the maximum results from such a field-frequency stabilized system.

The probe structure utilized in a side band resonance spectrometer of the above-described type and forming the subject invention contains vessels for holding the control sample and the sample under analysis, a separate radio frequency coil coupled to each sample, a sweep coil for the sample under analysis, a field modulating coil for both samples, an air spinner apparatus for the sample under analysis, shielding for the two samples, and certain electrical circuit elements. All of this structure must be placed within the narrow magnet gap with the samples located at optimum magnetic field regions.

It is also important that each of the two samples be shielded from the radio frequency driving magnetic field applied to and the radio frequency magnetic field produced by the precessing nuclei in the other example, i.e., that the two samples be isolated from each other as far as radio frequency magnetic field coupling is concerned. This feature is to be accomplished with the two samples placed as close together physically as possible because of the desirability of locating them in the optimum polarizing field region. At the same time, a sweep magnetic field of, for example 600 milligauss, is applied to one of the samples to sweep the system slowly (for example, 25 seconds) through the resonance spectrum and the other sample is isolated from this field. Also, at the same time, the audio or low frequency modulating field of, for example, 5 kilocycles which results in the side band resonances in the two samples is applied to the polarizing magnetic field, a single coil serving to modulate the field at both samples. From the above discussion, it is apparent that considerable attention must be directed to the proper positioning and shielding of the two samples within the small enclosure of the probe.

Therefore, an object of this invention is to provide a novel improved probe structure which serves to improve the resolution, sensitivity and stability of a two-sample gyromagnetic resonance spectrometer apparatus.

One feature of this invention is the provision of a unitized, rugged probe construction which contains two samples, the control sample and the test sample; an audio frequency magnetic field modulating coil for both samples; a radio frequency coil for each sample; and a magnetic field sweep coil for the test sample.

Another feature of this invention is the provision of a novel probe structure wherein the test sample is placed within a long, narrow sweep coil having closely spaced parallel wires within each of long oppositely disposed parallel sides to provide a homogeneous magnetic field which has uniformity along the axis of the coil wherein the oppositely disposed parallel sides substantially form an infinite current sheet.

Another feature of this invention is the provision of a novel probe structure wherein the control sample is placed as close to the test sample as possible but external of the long narrow sweep coil so that the magnetic field of the sweep coil does not affect the precession of the known sample.

Another feature of this invention is the provision of entirely separate, radio-frequency shields around each sample for mutually shielding each sample's R.F. pick-up coil from all R.F. fields produced by the R.F. coils of the other sample while the audio frequency magnetic field is not shielded from either sample.

Still another feature of the present invention is the provision of a rhodium plating on the magnetic shielding parts to obtain near zero magnetic susceptibility.

Another feature of the present invention is the provision of a simple spinner means for a sample tube which spinner is made of easily machined parts, has little or no vibration, no associated magnetic field, and no lubricating oils.

Another feature of the present invention is the provision of a spinner for a sample tube and an air damper on the sample tube to limit and steady its rotational speed.

Another feature of the present invention is the provision of a control sample consisting of a water solution in which the resonant line width for hydrogen is artificially broadened, the line width remaining stable over a long period of time and with changing environment.

These and other features and advantages of the present invention will be more apparent after a perusal of the following specification taken in connection with the accompanying drawings wherein, FIG. 1 is a view of the probe near circular poles of a magnet and the mounts for the probe, FIG. 2 is a partial sectional and cut-away view taken along line 2—2 of FIG. 1, FIG. 3 is an enlarged and partial sectional view taken on line 3—3 of FIG. 2, FIG. 4 is an enlarged detail view of the spinner nozzle enclosed by circle 4 of FIG. 3, and FIG. 5 is a view along line 5—5 of FIG. 4.

Referring to the drawings, FIGS. 1 and 2, in particular, there is shown a probe assembly 11 supported by a probe holder assembly 12 within a magnetic field formed between two magnet pole faces 13 and 14. The majority of structural elements serving to make up this probe are made of low magnetic susceptibility material such as brass or aluminum. The probe 11 is a narow rectangular box having two parallel side plates 15 and 16 mounted on a narrow frame 17. Two spiral electrical coils 18 and 18' are formed on the inside plates 15 and 16 by the printed circuit technique to provide coils with minimum thickness. Although only one of the coils 18 or 18' may be needed, the two coils are preferred to increase the uniformity and strength of the field produced. Between the two spiral coils 18 and 18' are disposed two glass tubes 19 and 20. Tube 19 is smaller than tube 20 and is sealed and permanently installed within the probe and contains a control sample having known elements. The other tube 20 contains the test sample to be analyzed and is readily removed from the probe. The probe is disposed between the pole faces 13 and 14 so that the tubes 19 and 20 are in the vertical position.

The holder assembly 12 is attached by a V-shaped casting 22 to the underside of the annular frame 17 and slides horizontally on two rods 23 and 24 which are held by vertically disposed casting 26 that in turn slides vertically on a rod 27. A long non-magnetic bolt 28, which turns freely within the vertical casting 26 and is held in place by collars 29 and 30, is threaded into the V-shaped casting 22 to provide horizontal positioning of the probe 11. Vertical positioning is supplied in a similar manner by a vertical bolt and turning knob 31 which is disposed behind rod 27 and is threaded into a support member 32, this bolt and knob 31 serving to slide casting 26 on rod 27.

The tube 19 containing the control sample and the tube 20 containing the test sample are preferably placed side by side and as close as practical within the probe in order that both samples are in approximately the same magnetic field strength.

Referring to FIG. 3, radio frequency coils 33 and 34 are disposed around each of the tubes 19 and 20, respectively, and preferably each coil is disposed at the axis of the center of the arc portions of the coils 18, 18' to provide a uniform audio frequency field at each sample. The R.F. coil 33 is enclosed by a radio frequency magnetic shield formed of four thin conducting plates, plates 35 and 36 aligned perpendicular to the pole faces 13 and 14 and plates 35' and 36' aligned parallel to the pole faces. The plates 35, 36, 35' and 36' are bolted to blocks 37 and 38 while block 38 is supported on an enclosure 39 which encloses the circuitry that resonates coil 33 through leads 40. Thus, the tube 19 is held within aligned apertures 41 and 41' in blocks 37 and 38, respectively. For rigidity, since plates 35, 36, 35' and 36' are only .0015 inch thick, the R.F. magnetic shield is physically closed by two cover plates 42 (FIG. 1) disposed parallel to the pole faces and made of insulating material which does not affect the main magnetic field H passing therethrough.

The R.F. coil 34 is enclosed like R.F. coil 33 by four thin conducting plates, plates 43 and 44 disposed perpendicular to the pole faces and plate 43' and 44'' disposed parallel thereto. These plates are mounted on opposite ends to two blocks 45 having aligned apertures 46. A long, single layer, magnetic sweep coil 47 whose axis is parallel to the axis of the main magnetic field $H_o$ is wound around plates 43 and 44 and blocks 45. The sweep coil 47 has long parallel sides which lie adjacent to plates 43 and 44 and enclose the R.F. coil 34. The coil 47 is wound so that the wires within its parallel sides are oriented substantially parallel to each other as shown in FIG. 2. Some deviation from parallelism is necessary to form an opening 48 and opening 49 which are aligned with apertures 46 in blocks 45 and perpendicularly to the coil axis so that tube 20 may extend through the coil 47. The parallel wires in the long side walls of the coil 47 produce uniform current density across the walls to simulate a uniform current sheet and provide a uniform magnetic field at the center of the coil 47. The parallel sides of the coils may also have multiple layers of parallel wires if a stronger magnetic field for a given current is required. Greater uniformity of field can be obtained by adding more layers of wires (not shown) at the ends of the coil 47 than at the center. The wire for coil 47 is coated with a thin insulating material. For rigidity, the coil 47 is supported on a frame which comprises the R.F. magnetic shield for coil 34 and which, like the magnetic shield for coil 33, is physically closed by two cover plates 50 (FIG. 1). These plates, like plates 42, are also made of an insulating material which does not affect the main magnetic field H. Plates 35, 36, 35' and 36' and plates 43, 44, 43' and 44' can be made of any non-magnetic material but are preferably made of brass or beryllium copper. For example, a rhodium plating thereon produces a material which has zero magnetic susceptibility to the magnetic field produced by the two pole faces and coils 18. As is well known, so-called nonmagnetic materials are not totally nonmagnetic, but have finite susceptibilities, typically about $10^{-6}$. By plating or coating a nonmagnetic material, such as brass, having a negative susceptibility, with a material such as rhodium, having a positive susceptibility, the total susceptibility of the plates is effectively reduced, thus making the plates more nonmagnetic.

Above the sweep coil 47 is disposed an air turbine assembly 51 to rotate the tube 20 containing the test sample. Rotating the tube 20 averages the effect of any small field inhomogeneities which may exist. The spinner assembly 51 is air operated so that smooth motion is obtained without the presence of lubricating oils or extraneous magnetic fields caused by electric motors. The compressed air to operate the turbine enters through a tube 52 into a vertical bore 53 formed in a turbine housing 54. A tubular insert 56 having two sets of radial bores 57 and 58 is disposed within bore 53 so that radially extending flanges on the insert 56 form a seal at both ends of bore 53 enclosing a tubular compartment. The lower protruding end 56' of the insert 56 terminates within bore 46 of the upper block 45. Radial bores 58 communicate with a short bore portion 59 within insert 56, which portion has a diameter slightly greater than the diameter of the glass tube 20 so that air entering the bore portion 59 through radial bores 58 forms opposing columns of air which spaces the tube 20 from the insert 56 and thereby providing a low friction bearing. The air does not affect the proton spectrum of the test sample but a more conventional oil film would as it also contains combined protons. A turbine nozzle 61 is disposed at the other end of insert 56 and within an enlarged bore portion 62 therein. Referring to FIGS. 4 and 5, the nozzle 61 at one end has a plurality of helical grooves 63 formed in a radial flange which grooves in cooperation with insert 56 form helical ducts that cause the compressed air to spin as it exits from the probe. Air is guided to the helical ducts by radial bores 57 formed in the insert 56 and by cuts 64 formed in a flange 65 disposed at the other end of the nozzle 61. An axial bore 66 in nozzle 61 like bore portion 59 centers the tube 20 and the opposing columns of air are formed by high velocity air passing through radial bores 67 formed in the nozzle 61.

The spinning air from the helical ducts 63 engages radially extending grooves 68 formed in a radially extending surface of a plastic rotator 69 disposed on the tube 20. The rotator 69 is rotated on a vertical axis by the impinging air stream and its wings 69' regulate the rotational motion by requiring non-linear increases in torque for increases in speed. A metal ring 70 is disposed around the turbine assembly to increase the radially extending surface 70' under the rotator 69 which controls the stiffness of the air cushion and prevents up and down oscillation of the tube 20 and rotator.

The R.F. power to the R.F. coil 34 is supplied by leads 71 extending from an enclosure 72, down along a tubular sleeve 73 disposed within sweep coil 47 and thence to R.F. coil 34. The function of sleeve 73 is to support the coil 34. Since sleeve 73 lies between the tube 20 and the R.F. coil 34, the wall of the sleeve is made as thin as possible and of material, for example, a plastic which does not affect the magnetic fields therein. Enclosure 72, like enclosure 39, encloses circuitry to resonate coil 34. Direct current power to the sweep coil 47 is supplied by leads 74. Two coaxial cables 76 and 77 (FIG. 1) extend from the probe and each supplies R.F. power to coils 34 and 33 through the circuitry within 72 and 39, respectively, and also carry R.F. signals induced in 34 and 33 by nuclear precession to the spectrometer receiver. A cable 78 comprising a plurality of single strands of wire supplies power to coils 18 and sweep coil 47.

Since the over-all dimension of the probe 11, as shown, by way of example is approximately 5 by 3¾ by ¾ inches, space therein must be conserved. Space is conserved by making the tube 19 containing the known sample as short as possible. The ends of a short glass tube are difficult to seal when the tube is filled with a liquid because the liquid being close to the end will boil away as the glass is heated to seal it. Therefore, at one end of the tube 19 is formed a bulb 79 whose volume is approximately equal to at least one-half the volume of the remaining tube. The bulb 79 and half of the remaining tube 19 are filled with the known liquid and the other end of the tube can now easily be sealed without boiling the liquid as glass is a good insulator. The tube 19 is inserted within the probe 11 with the bulb 79 on the top and therefore the tube 19 is filled at least up to the bulb 79.

This probe may be used to analyze organic compounds or silicones as well as other compounds with compounds of other nuclei used in tube 19.

The width of the resonant line of the control sample nuclei must appear somewhat broadened to the instrument. This is due to the fact that the probe 11 is adjusted by the holder 12 so that the test sample's R.F. coil 34 is aligned in the center of the pole faces 13 and 14 where the field H is most uniform. Where the R.F. coil 33 for the control sample is located, the field strength is not as uniform. If the resonance line width is made to match the non-uniformity of the magnetic field across the control sample tube 19, the signal to noise ratio of the control is maximized because more protons within the sample would be in resonance with the magnetic field and not the few protons within the sample that are located within the narrow magnetic field band that corresponds to the precession frequency of the clear water protons.

For hydrogen resonance experiments, we have found that a water solution gives the most desirable resonant line with sufficient broadening and also that the particular solution used for this probe is very stable with time. The resonant precession ratio for the water proton is made to appear broadened to cover the field non-uniformity by the addition of certain additives into the water. Suitable additives which produce a 16 cycle per second bandwidth were found to be a .005 molar solution of ferric chloride having a small amount of hydrochloric acid to produce a pH factor of 1.4 so that the ferric chloride remains in solution. Also, a .001 molar solution of manganese chloride has been found to be satisfactory as well as a .003 molar solution of gadolinium chloride.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyromagnetic probe assembly comprising an enclosure having two parallel sides, means adapted to secure two gyromagnetic samples within said enclosure, means for providing a radio frequency magnetic field for each sample, a magnetic field sweep coil for one of said samples, said sweep coil having two opposing, substantially parallel side-sections disposed perpendicularly to said two parallel sides, said side-sections having substantially parallel wires disposed parallel to said two parallel sides, a spinner means for rotating one of said samples, and a flat spiral modulating coil disposed on at least one of said parallel sides.

2. A gyromagnetic assembly comprising an enclosure, means adapted on said enclosure for supporting said enclosure between two magnetic poles, means adapted to secure two samples closely side by side within said enclosure, slidable and threaded means for positioning said enclosure relative to such poles, an audio frequency magnetic field modulating coil within said enclosure, two radio frequency precession coils within said enclosure, separate ones of said radio frequency coils being coupled to each sample, and a magnetic field sweep coil disposed around one of said samples and within said enclosure.

3. The gyromagnetic probe assembly of claim 2 wherein said samples to be secured are contained in glass tubes disposed parallel to each other, said radio frequency coils being disposed around each tube, said magnetic field sweep coil being elongated and disposed around said radio frequency coil of one of said glass tubes with the axis of the sweep coil perpendicular to said one glass tube and the elongated sides of said sweep coil disposed parallel to said one glass tube, and a magnetic shielding means formed from thin conducting plates for mutually isolating the radio frequency magnetic fields of each of said coils.

4. The probe assembly of claim 3 wherein said magnetic shielding means comprises a brass sheet plated with rhodium and disposed between said precession coils of said samples.

5. The probe assembly of claim 3 wherein said magnetic shielding means comprises a first magnetic shielding member disposed between said precession coil of said one tube and said sweep coil, and a second magnetic shielding member disposed between said precession coil of said other tube and said sweep coil.

6. A gyromagnetic probe assembly comprising an enclosure, two samples enclosed with elongated glass tubes, one of said tubes disposed completely within said enclosure, the other of said tubes protruding through a wall of said enclosure, a radio frequency coil for each sample, an audio frequency magnetic field coil disposed perpendicularly to said radio frequency coils, an air spinner means for spinning said other tube within its radio frequency coil, and a magnetic field sweep coil disposed around one of said samples and within said enclosure for changing the magnetic field around only one of said samples.

7. A gyromagnetic probe assembly comprising an enclosure, means adapted to secure two samples within said enclosure, means for providing a radio frequency magnetic field for each sample, a magnetic sweep coil for one of said samples, a magnetic coil within said enclosure oriented with said coil's axis perpendicular to said radio frequency magnetic fields for forming an audio frequency magnetic field, a spinner means for one of said samples, and a holder assembly for said enclosure including means for moving said enclosure in directions mutually perpendicular to each other.

8. A gyromagnetic probe assembly comprising an enclosure including a frame and two side plates, two samples each enclosed within an elongated glass tube, one of said glass tubes being disposed completely within said enclosure, the other of said glass tubes protruding through said frame, said one tube protruding axially through a first metal tube made of magnetic shielding material, said other tubes protruding axially through a second metal tube also made of magnetic shielding material, a magnetic sweep coil disposed around said second metal tube with the axis of said coil perpendicular to the axis of said second tube, a spinner means disposed adjacent said magnetic coil for spinning said other tube, a flat spiral coil disposed on at least one side plate, and a radio frequency precession coil disposed within each first and second metal tubes and around each of said glass tubes.

9. The probe assembly of claim 8 wherein said first and second metal tubes are longer in one transverse dimension than in a perpendicular transverse dimension, said metal tubes each having oppositely disposed side walls which are substantially parallel to each other and to the sides of said other metal tube, each of said glass tubes are disposed parallel to said parallel disposed sides and said side plates, and said metal tubes are disposed as close to each other as practical.

10. The gyromagnetic probe assembly of claim 9 wherein said coil disposed around said second metal tube has its wires disposed substantially parallel where said wires are adjacent said parallel sides.

11. A gyromagnetic probe assembly including a spinner means for a sample enclosed within an elongated glass tube protruding from a magnetic sweep coil, said spinner means comprising a housing having a bore therethrough, an insert also having a bore therethrough disposed within said bore of said housing to form a closed-end tubular compartment between said insert and said housing, said bore of said insert having a smaller diameter portion at one end than the other end, a nozzle member having a bore therethrough disposed within the larger diameter end of said bore of said insert with its bore aligned with said smaller diameter portion in said insert, said nozzle having a flange formed at each end wherein said flanges bear against the side of the bore of said insert, one spiral groove formed in the side of said flange disposed at the outer end of said nozzle, and means for supplying compressed gas into said closed end tubular compartment and out through said spiral groove.

12. The gyromagnetic probe assembly of claim 11 wherein at least one radial duct communicates between said smaller diameter bore portion of said insert and said closed ended tubular compartment, and at least one radial duct is formed in said nozzle.

13. The gyromagnetic assembly of claim 11 wherein said glass tube is disposed within a turbine member having a bore therethrough, said member having one surface substantially transverse to said bore therein, and radial grooves extending from said bore form in said surface whereby gas exiting from said nozzle cause said turbine to rotate about said bore.

14. A gyromagnetic probe assembly including an enclosure having a flat side, an audio frequency magnetic field modulating coil, said coil comprising a flat spiral wound coil disposed on said flat side, two radio frequency precession coils, said modulating coil being spiral wound to form an oval wherein the centers of the arc end portions of the oval coil are spaced apart, and said precession coils being disposed one at each center whereby both precession coils are disposed in modulating magnetic fields of equal value.

15. A gyromagnetic probe assembly comprising an enclosure, means adapted to secure two samples closely side by side within said enclosure, an audio frequency magnetic field modulating coil within said enclosure, two radio frequency precession coils within said enclosure, a magnetic field sweep coil disposed around one of said samples and within said enclosure, and a holder assembly for supporting said enclosure within a magnetic field including means for moving said enclosure in directions mutually perpendicular to each other.

16. A gyromagnetic probe assembly comprising an enclosure including an annular frame and two side plates, two samples each enclosed within an elongated glass tube, one of said glass tubes being disposed completely within said enclosure, the other of said glass tubes protruding through said frame, said one glass tube protruding through a first metal tube made of magnetic shielding material, said other glass tubes protruding through a second metal tube also made of magnetic shielding material, a magnetic coil disposed around said second metal tube with the axis of the coil perpendicular to the axis of the tube, a spinner means disposed adjacent said magnetic coil for spinning said other glass tube, a flat spiral coil disposed on at least one side plate, a radio frequency precession coil disposed within each first and second metal tubes and around each of said glass tubes, and a holder assembly for a gyromagnetic probe assembly comprising a first member fixed to said probe and slideable on at least one horizontal rod, said horizontal rod mounted on a second member slideable on at least one vertical rod, and means for providing horizontal and vertical motion to said probe and clamping said probe in place.

17. A gyromagnetic probe assembly including an air spinner means for a sample enclosed within an elongated glass tube, such tube being disposed within a tubular bore insert, said spinner means comprising means for directing opposing columns of air substantially radially at said glass tube for maintaining said glass tube spaced from the tubular bore insert, an air turbine means including helical grooves for inducing a torque on said glass tube to cause said glass tube to rotate, and to be supported on an air cushion thrust bearing and a second means disposed on said glass tube for increasing rotational resistance of said spinner means non-linearly with rotational speed.

18. A gyromagnetic probe assembly comprising: an enclosure; means adapted to secure two gyromagnetic samples closely side by side within said enclosure; means for providing a radio frequency magnetic field for each sample; means for providing a conductive shield for each sample, whereby the field around one sample does not affect the other sample, means for supporting said enclosure between two magnetic poles, said conductive shields being coated with a material having a magnetic susceptibility opposite in polarity to the susceptibility of the material of the shields.

19. A gyromagnetic probe assembly as in claim 18 wherein the conductive shields are made from brass and are coated with rhodium.

References Cited in the file of this patent

UNITED STATES PATENTS

| | | |
|---|---|---|
| 2,864,995 | Shoolery | Dec. 16, 1958 |
| 2,908,858 | Nelson | Oct. 13, 1959 |
| 2,913,658 | Burdine | Nov. 17, 1959 |

(Other references on following page)

UNITED STATES PATENTS

| | | |
|---|---|---|
| 2,955,252 | Williams | Oct. 4, 1960 |
| 3,034,040 | Williams | May 8, 1962 |
| 3,038,115 | Mueller | June 5, 1962 |

FOREIGN PATENTS

| | | |
|---|---|---|
| 771,958 | Great Britain | Aug. 10, 1957 |
| 1,206,700 | France | Aug. 31, 1959 |

OTHER REFERENCES

Anderson: Physical Review, vol. 76, No. 10, Nov. 15, 1949, pp. 1460–1470 incl.

Beringer et al.: Physical Review, vol. 95, No. 6, September 1954, pp. 1474–1481 incl.

Shoolery et al.: Journal of Chemical Physics, vol. 23, No. 5, May 1955, pp. 805–811 incl.

Baker et al.: The Review of Scientific Instruments, vol. 28, No. 5, May 1957, pp. 313–321 incl.

Sherman: The Review of Scientific Instruments, vol. 30, No. 7, July 1959, pp. 568–575 incl.

Pople: High Resolution Nuclear Magnetic Resonance, McGraw Book Co. Inc., New York, 1959, pp. 69–74 incl.

UNITED STATES PATENT OFFICE
CERTIFICATE OF CORRECTION

Patent No. 3,172,035                                            March 2, 1965

James T. Arnold et al.

It is hereby certified that error appears in the above numbered patent requiring correction and that the said Letters Patent should read as corrected below.

Column 1, line 42, before "polarizing" insert -- the --; line 50, for "520" read -- 5200 --; column 2, line 11, for "example" read -- sample --; column 4, line 41, strike out "two".

Signed and sealed this 22nd day of March 1966.

(SEAL)
Attest:

ERNEST W. SWIDER                                         EDWARD J. BRENNER
Attesting Officer                                            Commissioner of Patents